(12) United States Patent  (10) Patent No.: US 8,248,365 B2
Baudisch et al.  (45) Date of Patent: *Aug. 21, 2012

(54) SYSTEM AND METHOD FOR ACQUIRING A TARGET WITH INTELLIGENT POINTER MOVEMENT

(75) Inventors: Patrick M. Baudisch, Seattle, WA (US); Adam Eversole, Redmond, WA (US); Paul S. Hellyar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1157 days.

This patent is subject to a terminal disclaimer.

(21) Appl. No.: 12/106,964

(22) Filed: Apr. 21, 2008

(65) Prior Publication Data

US 2008/0198130 A1  Aug. 21, 2008

Related U.S. Application Data

(63) Continuation of application No. 10/829,127, filed on Apr. 21, 2004, now Pat. No. 7,383,517.

(51) Int. Cl.
*G06F 3/033* (2006.01)
(52) U.S. Cl. ........ 345/157; 345/156; 715/856; 715/857; 715/858
(58) Field of Classification Search .................. 345/157, 345/173–178, 204, 156; 348/63, 171; 382/108; 715/856–857, 862
See application file for complete search history.

(56) References Cited

U.S. PATENT DOCUMENTS

| 5,123,087 A | 6/1992 | Newell |
| 5,164,713 A * | 11/1992 | Bain ............................ 715/862 |
| 5,596,347 A | 1/1997 | Robertson |
| 5,642,131 A | 6/1997 | Pekelney |
| 5,655,095 A | 8/1997 | LoNegro |
| 5,703,620 A | 12/1997 | Keyson |
| 5,732,228 A | 3/1998 | Jaaskelainen, Jr. |
| 5,774,111 A | 6/1998 | Lecland |
| 5,776,645 A * | 7/1998 | Barr et al. ...................... 430/22 |
| 5,786,805 A | 7/1998 | Barry |
| 5,808,601 A | 9/1998 | Leah |
| 5,815,137 A | 9/1998 | Weatherford |
| 5,870,079 A | 2/1999 | Hennessy |
| 5,933,138 A | 8/1999 | Driskell |
| 5,973,670 A | 10/1999 | Barber |
| 6,031,531 A | 2/2000 | Kimble |
| 6,078,308 A | 6/2000 | Rosenberg |
| 6,137,487 A | 10/2000 | Mantha |
| 6,392,675 B1 | 5/2002 | Becker |
| 6,480,813 B1 | 11/2002 | Bloomquist |
| 6,587,131 B1 | 7/2003 | Nakai |
| 6,654,003 B2 | 11/2003 | Boldy |

(Continued)

OTHER PUBLICATIONS

Douglas, S.A., et al., "Testing Pointing Device Performance and User Assessment with the ISO 9241, Part 9 Standard," Proc. CHI '99, Pittsburgh, Pennsylvania, May 15-20, 1999, pp. 215-222.

(Continued)

*Primary Examiner* — Lun-Yi Lao
*Assistant Examiner* — Shaheda Abdin
(74) *Attorney, Agent, or Firm* — Lee & Hayes, PLLC

(57) ABSTRACT

The present invention is generally directed to assisting users to position a pointer on a target. Embodiments of the present invention provide a system, method, and computer-readable medium that guide a pointer toward a target. After the pointer is located on a target, pointer movement continues to be adjusted so that the user may easily keep the pointer located on the target.

18 Claims, 14 Drawing Sheets

U.S. PATENT DOCUMENTS

| | | | |
|---|---|---|---|
| 6,693,653 | B1 | 2/2004 | Pauly |
| 6,867,790 | B1 | 3/2005 | Brooks |
| 6,907,581 | B2 | 6/2005 | Noy |
| 6,995,746 | B2 | 2/2006 | Aymeric |
| 7,012,199 | B2 * | 3/2006 | Fukuda .................. 178/18.02 |
| 7,098,933 | B1 | 8/2006 | Thoemmes |
| 7,825,954 | B2 * | 11/2010 | Zhang et al. .................. 348/169 |
| 2004/0017355 | A1 * | 1/2004 | Shim .................. 345/157 |

OTHER PUBLICATIONS

Dulberg, M.S., et al., "An Imprecise Mouse Gesture for the Fast Activation of Controls," Proc. INTERACT '99, Edinburgh, Scotland, Aug. 30-Sep. 3, 1999, pp. 375-382.

Johanson, B., et al., "PointRight: Experience with Flexible Input Redirection in Interactive Workspaces," Proc. UIST '02, Paris, France, Oct. 27-30, 2002, pp. 227-234.

McGuffin, M., and R. Balakrishnan, "Acquisition of Expanding Targets," Proc. CHI '02, Minneapolis, Minnesota, Apr. 20-25, 2002, pp. 57-64.

Moyle, M., and A. Cockburn, "Analysing Mouse and Pen Flick Gestures," Proc. of the SIGCHI-NZ Symposium on Computer-Human Interaction 2002, Hamilton, New Zealand, Jul. 11-12, 2002, pp. 19-24.

Worden, A., et al., "Making Computers Easier for Older Adults to Use: Area Cursors and Sticky Icons," Proc. CHI '97, Atlanta, Georgia, Mar. 22-27, 1997, pp. 266-271.

* cited by examiner

SYSTEM AND METHOD FOR ACQUIRING A TARGET WITH INTELLIGENT POINTER MOVEMENT

CROSS REFERENCE TO RELATED APPLICATION

This application is a continuation of application Ser. No. 10/829,127, filed Apr. 21, 2004, which is incorporated by reference herein in its entirety.

BACKGROUND

The present invention relates in general to an improved graphical user interface. More specifically, the present invention relates to an improved system and method of placing a pointer on a target in a graphical user interface. A great number of computer devices (e.g., personal computers, personal digital assistants ("PDAs"), cellular telephones, etc.) employ a graphical user interface (hereinafter "GUI") to interact with users. A GUI is an input/output (I/O) system characterized by the use of graphics on a computer display to communicate with a computer user. Frequently, the user employs an input device, such as a mouse or trackball, to manipulate and relocate a pointer on the computer display. When a user activates or "clicks" the input device while the pointer is at a designated position on a display, information is input into a computer device. Accordingly, a user does not need to memorize commands or have knowledge of keyboard typing to provide input to the computer device.

A GUI generally presents graphical display elements (hereinafter "GUI objects") as two-dimensional images composed of pixels on a computer display. The pointer is a GUI object that is presented as overlaying all other GUI objects. One coordinate on a pointer is a "hot spot," that identifies a specific location (i.e., coordinate position) where a pointer selection event may occur. However, in order for a pointer selection event to occur, the pointer's "hot spot" must be located on a target. In some instances, the coordinate position occupied by a GUI object is the target. For example, when a GUI object is an icon that initiates execution of a computer program, the coordinate position occupied by the icon is a target. In other instances, GUI objects consist of one or more smaller targets. For example, resize handles are targets that allow users to change the size of a GUI object by causing a pointer selection event to occur on the resize handle.

Positioning the "hot spot" of a pointer over a desired target, such as a resize handle, is often difficult to accomplish, leading to frustration and lowered productivity. In some instances, users with diminished visual or physical abilities, or lack of training have difficulty in positioning a pointer. In other instances, pointer positioning difficulty may be attributable to the computer device. For example, a computer display may provide a high-density presentation of material, rendering targets relatively small, thereby making precise pointer positioning difficult.

An inability to place the hot spot of a pointer on a specific target creates problems because the desired function may not easily be performed. Instead, the user may need to repetitively readjust a pointer to perform the desired function. Thus, acquisition aids have been developed to assist users acquire a target. For example, one acquisition aid "magnetizes" a target so that a pointer is drawn to the target when located less than a predetermined distance away from the target. A drawback to this approach is that the size of a target is effectively enlarged when magnetized so that other GUI objects located less than the predetermined distance from the target are difficult to acquire. Another acquisition aid makes a target "sticky" so that movement of the pointer on the target is not proportional to input received from the user. Stated differently, pointer movement is adjusted on the target so that a proportionally larger amount of input is required to affect movement of the pointer. While this approach helps users keep the pointer on a target, acquiring the target may still be difficult.

Typically, GUIs display more than one target and the user does not always want to acquire a target that has an acquisition aid. In this instance, the acquisition aid generates side effects that distort pointer movement away from the user's intended target. In the simplest form, an acquisition aid could automatically move the pointer to the target regardless of the input received from the user. While a target with this type of acquisition aid would be easy to acquire with the pointer, the side effects of this type of acquisition aid are vast as the user is not able to acquire any other targets on the computer display.

What is needed is a system and method for assisting users in acquiring a target that minimizes side effects. Desirably, the system and method are easy to use and do not require knowledge or training on the part of the user. The present invention addresses these needs and other shortcomings that currently exist.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter. The present invention is generally directed to assisting users in positioning a pointer on a target. More specifically, embodiments of the present invention provide a system, method, and computer-readable medium that guide a pointer toward a target. After the pointer is located on a target, pointer movement continues to be adjusted so that the user may easily keep the pointer located on the target. One embodiment of the present invention is a method that adjusts pointer movement when input causes the pointer to intersect with either a target or a guide area (hereinafter collectively referred to as "adjustment zones"). The method is implemented by a set of event-driven routines that determine if the projected movement of a pointer will intersect an adjustment zone. If the projected movement does not intersect an adjustment zone, already realized pointer positioning software computes the coordinate position of the pointer. Conversely, if the projected movement does intersect an adjustment zone, aspects of the present invention compute an adjusted coordinate position for the pointer. The calculation that computes an adjusted coordinate position for the pointer adjusts pointer movement so that positioning the pointer on the target is easy.

In accordance with another aspect of the present invention, the amount that pointer movement is adjusted in an adjustment zone, such as a guide area, depends on the distance the pointer is located from the target. Event-driven routines determine the location of the pointer in a guide area. The closer the pointer is located to the target, the more pointer movement is adjusted toward the target. This aspect of the present invention, which makes adjustment of pointer movement dependent on the pointer's location from the target, minimizes side effects caused by guide areas.

In accordance with other aspects of the present invention, guide areas that would normally overlap are redefined so that they do not overlap. Since GUIs typically display more than one target, the possibility exists that targets close in proximity may have associated guide areas that overlap. Because overlapping guide areas would cause undesirable adjustment of pointer movement, aspects of the present invention redefine the size and location of guide areas to prevent them from overlapping.

In one embodiment of the present invention, a computer device is described that adjusts pointer movement when input causes the pointer to intersect with one or more adjustment zones. The computer device includes an operating system in communication with various components including an input device, a computer display, a movement adjustment module, and one or more application programs. The movement adjustment module is configured to adjust the coordinate position of the pointer when the pointer intersects an adjustment zone.

In still another embodiment, a computer-readable medium is provided with contents (i.e., a program) that cause a computer device to operate in accordance with the method described herein.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Embodiments of the present invention provide a system, method, and computer-readable medium that adjust pointer movement when an input device causes the pointer to intersect with an adjustment zone. As known to those skilled in the art and others, a pointer is a pictorial depiction used to input information into a computer device and is typically represented with an arrow. However, pointers may be represented with any pictorial depiction capable of identifying a "hot spot" on a computer display. In accordance with the present invention, pointer movement is adjusted to help users place a pointer on a target. After the pointer is located on the target, pointer movement continues to be adjusted so that the position of the pointer may be maintained.

The following description first provides an overview of a system in which the present invention may be implemented. Then a method that adjusts pointer movement when input causes the pointer to intersect one or more adjustment zones, which is shown in accompanying diagrams, is described. The illustrative examples described herein are not intended to be exhaustive or to limit the invention to the precise forms disclosed. Similarly, any steps described herein may be interchangeable with other steps, or several combinations of steps, in order to achieve the same result.

Figure 1:
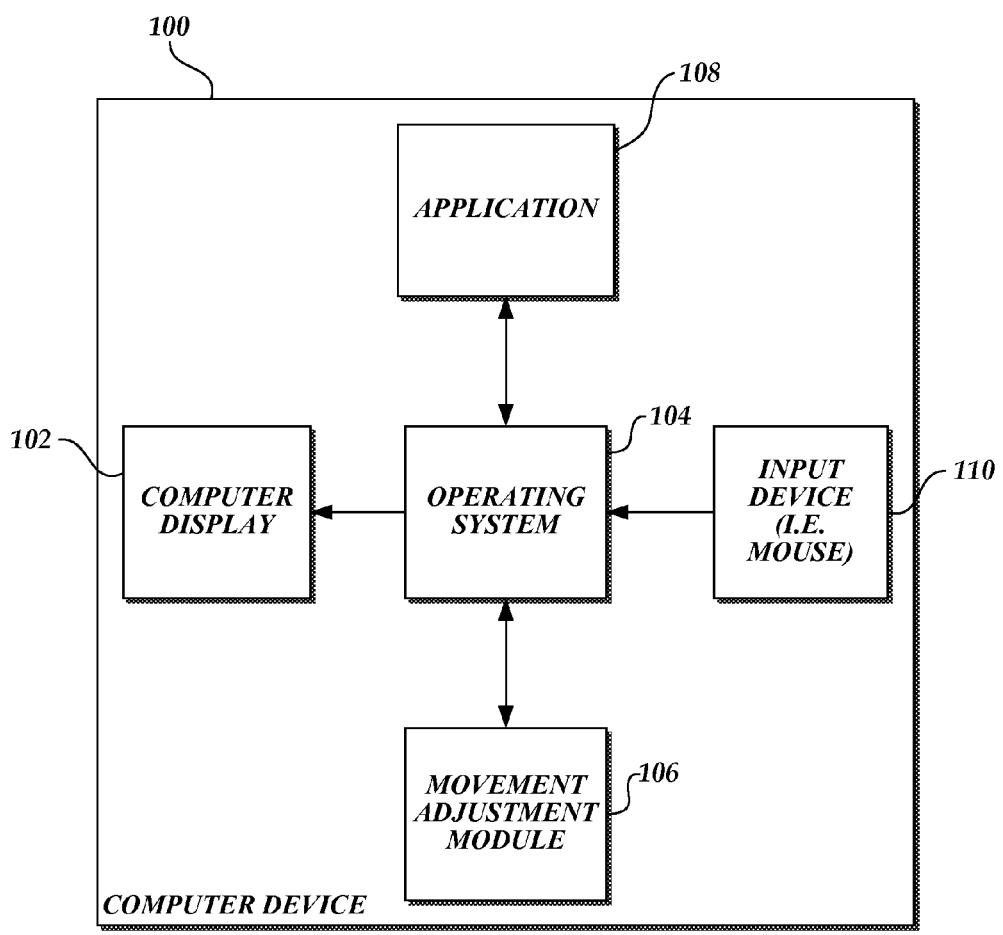
FIG. 1 is a block diagram of the computer device including a movement adjustment module that is suitable for adjusting pointer movement in accordance with the present invention.

FIG. 1 provides an exemplary overview of a computer device 100 in which embodiments of the invention may be implemented. The computer device 100 includes a computer display 102, an operating system 104, a movement adjustment module 106, an application 108, and an input device 110. The computer device 100 may be any one of a variety of devices including, but not limited to, personal computer devices, server-based computer devices, personal digital assistants, cellular telephones, other electronic devices having some type of memory, and the like. For ease of illustration and because they are not important for an understanding of the present invention, FIG. 1 does not show some of the typical components of many computer devices, such as memory, keyboard, central processing unit, and the like.

The operating system 104 may be a general-purpose operating system, such as a Microsoft® operating system, UNIX® operating system, or Linux® operating system. As known to those skilled in the art and others, the operating system 104 controls the general operation of the computer device 100 and is responsible for management of hardware and basic system operations, as well as running applications. More specifically, the operating system 104 ensures that computer programs, such as application 108, are able to use hardware resources. As illustrated in FIG. 1, the operating system 104 communicates with the computer display 102, which may include typical display devices, such as a monitor (e.g., CRT or LCD screen), a television, etc. The computer display 102 is suitable to display a pointer and other GUI objects.

The computer device 100 is configured to execute computer programs, such as application 108, which cause GUI objects to be displayed on the computer display 102. Application 108 may be any computer program which displays GUI objects including, but not limited to, editors, word processors, spreadsheets, browsers, computer-aided design, and the like.

The input device 110 interacts with a user and the operating system 104 to specify event-driven routines to execute. As known to those skilled in the art and others, the input device 110 may be any device capable of controlling a pointer on the computer display 102 including a mouse, trackball, touch pad, etc. In some computer devices the input device 110 may be contained within the same housing as the computer device 100. Such arrangements are commonly found where the computer device is a notebook computer. The user may operate the input device 110 to manipulate and relocate the pointer and activate the pointer at designated positions on the computer display 102. The operating system 104 monitors pointer movement and other pointer events and provides a mechanism for computer programs, such as application 108, to perform actions in response to these events.

As will be better understood from the following description, embodiments of the present invention are implemented by a set of event-driven routines located in the movement adjustment module 106. As illustrated in FIG. 1, the movement adjustment module 106 is interconnected and able to communicate with the operating system 104. As described in more detail below, the operating system 104 notifies the movement adjustment module 106 when the input device 110 is generating pointer movement. If the projected pointer movement intersects an adjustment zone aspects of the present invention compute the coordinate position of the pointer. The calculation adjusts pointer movement so that a target is easy to acquire with the pointer. The operating system 100 receives adjusted coordinate positions from the movement adjustment module 106 and causes the computer display 102 to display the pointer at the adjusted coordinates.

When software formed in accordance with the invention is implemented in a computer device, for example of the type illustrated in FIG. 1, the computer device provides a way for users to easily acquire a target. Allowing a user to easily acquire a target enhances the computer experience by making a GUI easier to use.

Figure 2:
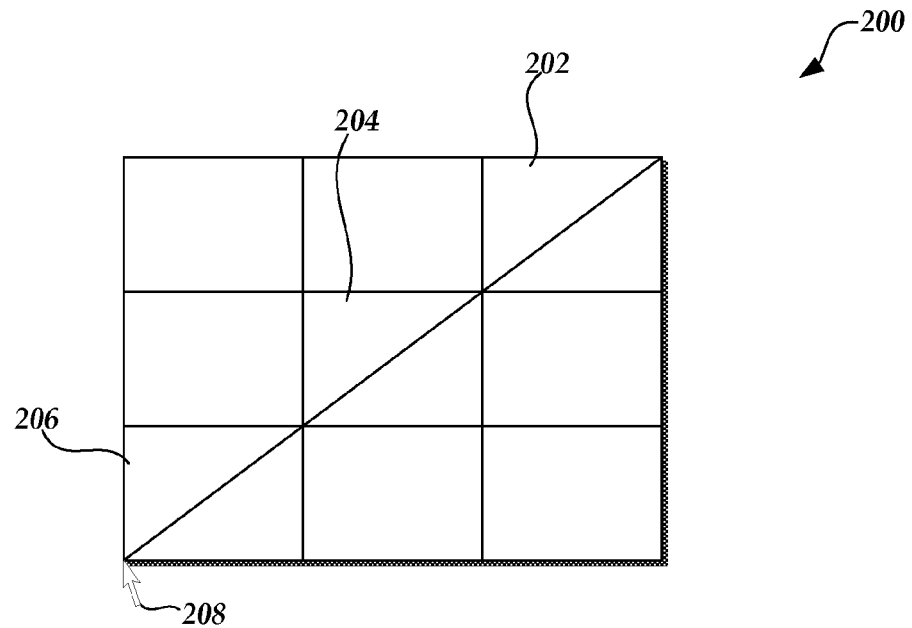
FIG. 2 is a pictorial depiction of a section of computer display that illustrates pointer movement in accordance with the prior art.

For illustrative purposes, a representative section of computer display 200 is depicted in FIG. 2. As known to those skilled in the art, a computer display is composed of pixels, which are the basic units used to represent images. Pixels are so small and numerous that, when displayed, they appear to merge into a single smooth image. The number of pixels represented on a computer display is called the pixel resolution. Typically, pixel resolutions are expressed as a pair of numbers, such as 640×480, which indicates that a computer display is composed of 640 pixels horizontally and 480 pixels vertically (or 640×480=307,200 pixels total). FIG. 2 is a pictorial depiction of a sample section of computer display 200 that contains a set of highly magnified pixels. More specifically, the sample section of computer display 200 contains pixels 202, 204, 206, a pointer 208, and a path 210 that represents pointer 208 movement. As shown in FIG. 2, a user-employed input device, such as input device 110, is used to relocate the pointer 208 across pixels 202, 204, and 206. The pointer 208 movement illustrated in FIG. 2 is not adjusted by embodiments of the present invention.

Figure 3:
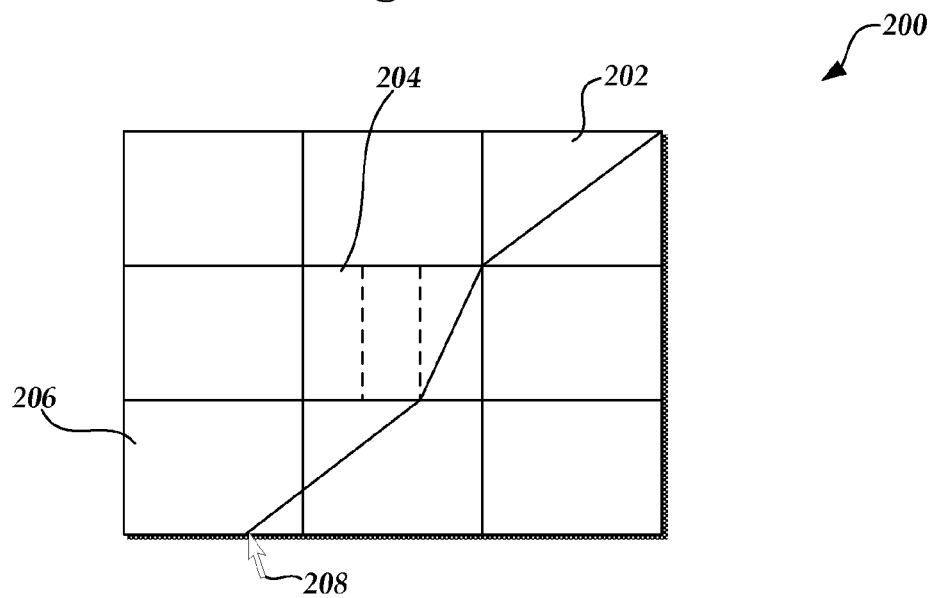
FIG. 3 is a pictorial depiction of the section of the computer display illustrated in FIG. 2, wherein one pixel of the computer display is designated as a guide area in accordance with the present invention.

FIG. 3 is an alternative illustration of the sample section of computer display 200 depicted in FIG. 2 wherein pixel 204 is designated as a guide area in accordance with the present invention. The path 300 generated by the pointer 208 in FIG. 3 is representative of the same input device movement as the path 210 illustrated in FIG. 2. However, when the pointer 208 intersects pixel 204 (FIG. 3), embodiments of the present invention adjust movement of the pointer 208 downward. In typical computer devices, there is a linear mapping between pointer movement and movement of an input device, such as a mouse. Embodiments of the present invention redefine the mapping between pointer and input device movement in adjustment zones. For example, pixel 204 in FIG. 3 requires three times as much horizontal movement from the input device (i.e., mouse distance movement) to traverse horizontally as pixel 204 in FIG. 2. The mapping of movement between input device and pointer is redefined in pixel 204 (FIG. 3) to guide the pointer 208 in a specific direction.

Figure 4:
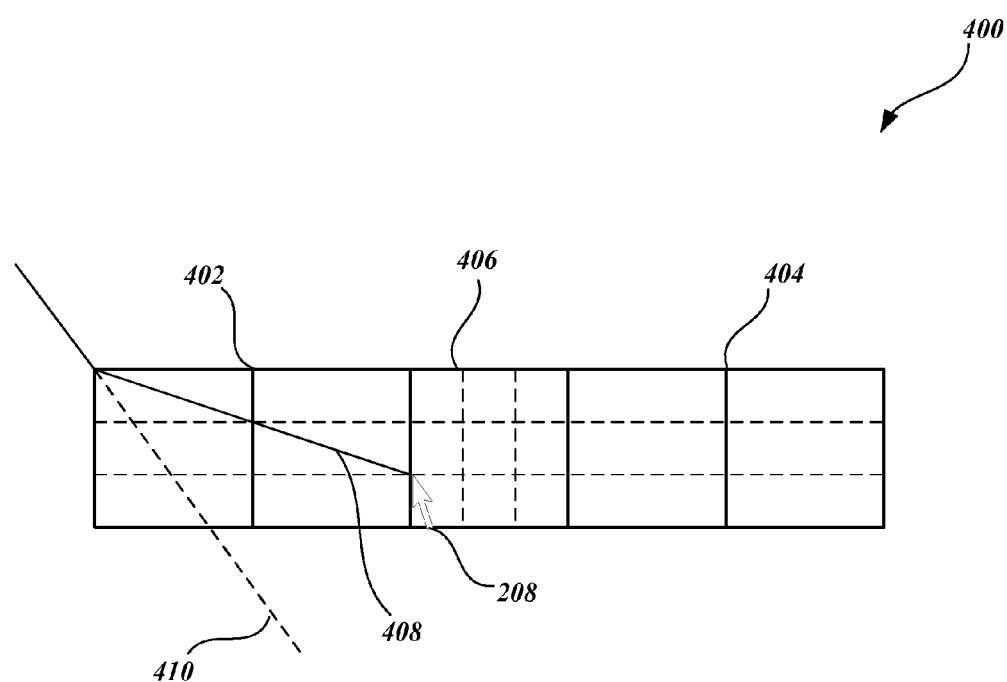
FIG. 4 is a pictorial depiction of the section of computer display with guide areas that assist users in acquiring a target in accordance with the present invention.

A representative section of computer display 400 that illustrates how guide areas help users acquire a target is depicted in FIG. 4. More specifically, the computer display 400 includes a pointer 208, guide areas 402 and 404, a target 406, and a path 408 that represents pointer 208 movement. As shown in FIG. 4, a user-employed input device, such as input device 110, is used to relocate the pointer 208 across guide area 402. Embodiments of the present invention redefine the mapping between pointer and input device movement in guide area 402 and adjust pointer 208 movement toward the target 406. The projected path 410 of the pointer 208 without adjustment by the present invention is also illustrated in FIG. 4. When the pointer 208 intersects the guide area 402, the pointer 208 is prevented from continuing on the current path 410. Instead, the pointer 208 changes direction because the mapping between input device movement and pointer movement is redefined in guide area 402 to adjust pointer 208 movement in a specific direction toward the target 406. As described in detail below, guide areas, such as guide areas 402 and 404 are building blocks that may be used to adjust pointer movement in any direction. Also guide areas may be combined in numerous configurations and shapes depending on their intended purpose.

As described above, the present invention supports guide areas that adjust pointer movement in any direction. Typically, guide areas will be permeable barriers that merely adjust pointer movement toward a target. Stated differently, a user that does not want to acquire a target may traverse a target's associated guide areas and proceed in the desired direction. However, the strength of a guide area may be adjusted by any amount including an amount that creates an impenetrable barrier to pointer movement.

Figure 5:
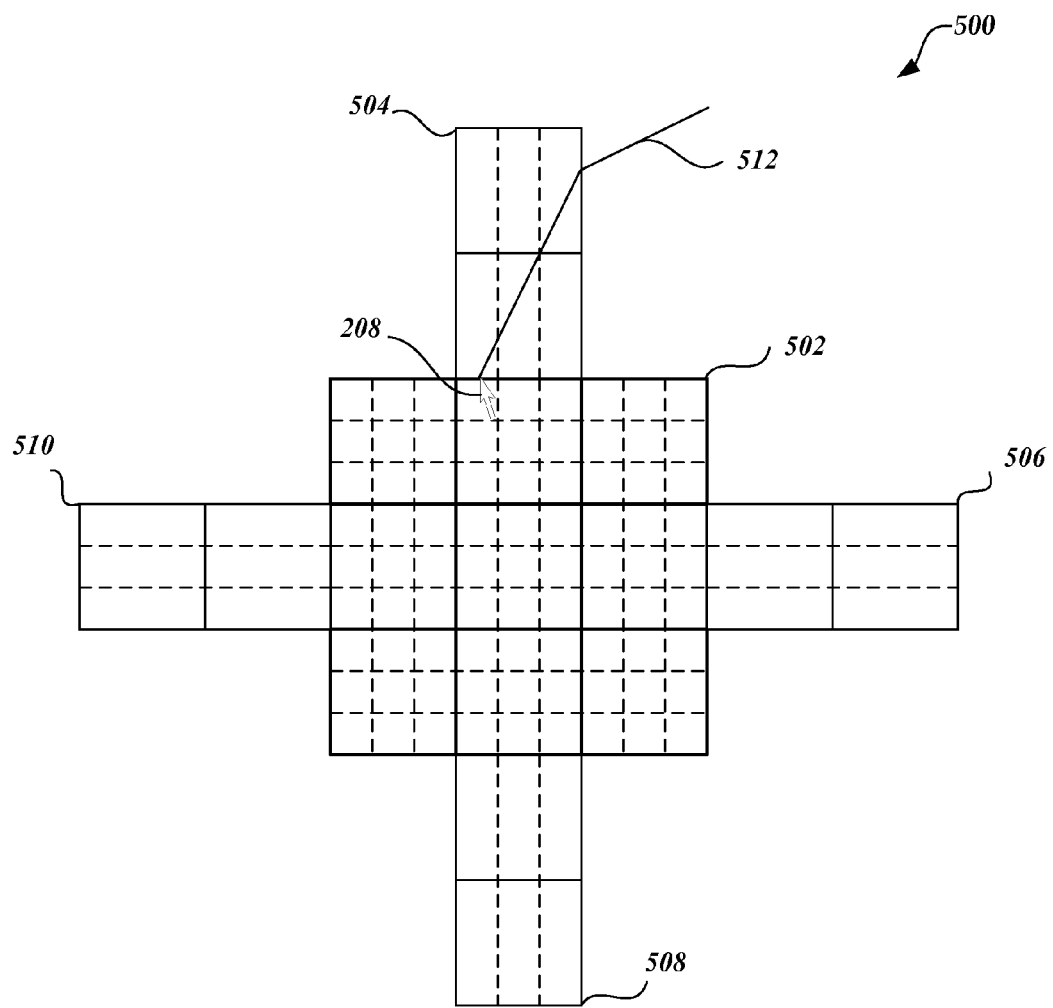
FIG. 5 is a pictorial depiction of a section of computer display with guide areas that assist users in acquiring a target in accordance with the present invention.

Another representative section of computer display 500 is depicted in FIG. 5 wherein an exemplary aspect of the present invention that helps users acquire a target is illustrated. The computer display 500 includes a target 502, guide areas 504, 506, 508, 510, a pointer 208, and a path 512 that represents pointer 208 movement. The target 502 illustrated in FIG. 5 is composed of nine (9) pixels in a 3×3 pixel square. The dashed lines inside each pixel of the target 502 indicate that pointer 208 movement is adjusted in the target 502 so that a proportionally greater amount of input (i.e., mouse distance movement) is required to cause a predetermined amount of pointer 208 movement. In other words, the ratio of input device distance movement to pointer distance movement changes when the pointer 208 intersects the target 502. As illustrated, the amount of input device distance movement required to traverse the target 502 in any direction is three (3) times greater than the amount required to traverse areas of the computer display 200 that are not designated as a target. A more detailed explanation of a method, system, and computer-readable medium that adjusts pointer movement inside one type of target, may be found in commonly assigned, co-pending U.S. patent application Ser. No. 10/828,890, titled System and Method for Aligning Objects Using Non-Linear Pointer Movement, and filed concurrently herewith, the content of which is expressly incorporated herein by reference.

As illustrated in FIG. 5, each guide area 504, 506, 508, and 510 is a rectangular shape. Guide areas 504 and 508 are each composed of two (2) pixels in a 1×2 pixel rectangle. Similarly, guide areas 506 and 510 are composed of two (2) pixels in a 2×1 pixel rectangle. The dashed lines inside the guide areas 504, 506, 508, and 510 indicate that pointer 208 movement is adjusted in each guide area so that a proportionally greater amount of input (i.e., mouse distance movement) is required to cause a predetermined amount of pointer 208 movement in one component direction. In other words, the ratio of mouse distance movement to pointer distance movement is different in guide areas than other areas of the computer display 500. Each guide area adjusts pointer movement toward the target 502 when intersected with the pointer.

FIG. 5 illustrates the effect that changing the ratio of input device distance movement to pointer 208 distance movement in one component direction of the guide area 504 has on movement of the pointer 208. The path 512, which is indicative of pointer movement, represents input device movement with constant speed and direction. Even though the input device has constant speed and direction, the pointer 208 changes direction toward the target 502 when the guide area 504 is intersected. As shown in FIG. 5, traversing the guide area 504 horizontally requires three times as much horizontal movement from an input device as other areas of the computer display 500. However, traversing the guide area 504 vertically does not require any more vertical movement from the input device. Stated differently, while the mapping of horizontal input device movement to pointer movement in guide area 504 is non-linear, the mapping of vertical input device movement to pointer movement remains linear. As a result, the pointer 208 changes direction toward the target 502 when the guide area 504 is intersected.

FIG. 5 illustrates the primary difference between adjustment of pointer movement in a target compared to adjustment of pointer movement in a guide area. In a target, pointer movement is adjusted by the same proportional amount in all component directions. Stated differently, the ratio of input device movement to pointer device movement is the same in all component directions of a target. Conversely, in guide areas, an imbalance exists. Pointer movement in one component direction requires a proportionally greater amount of input device movement than other component directions.

Figure 6:
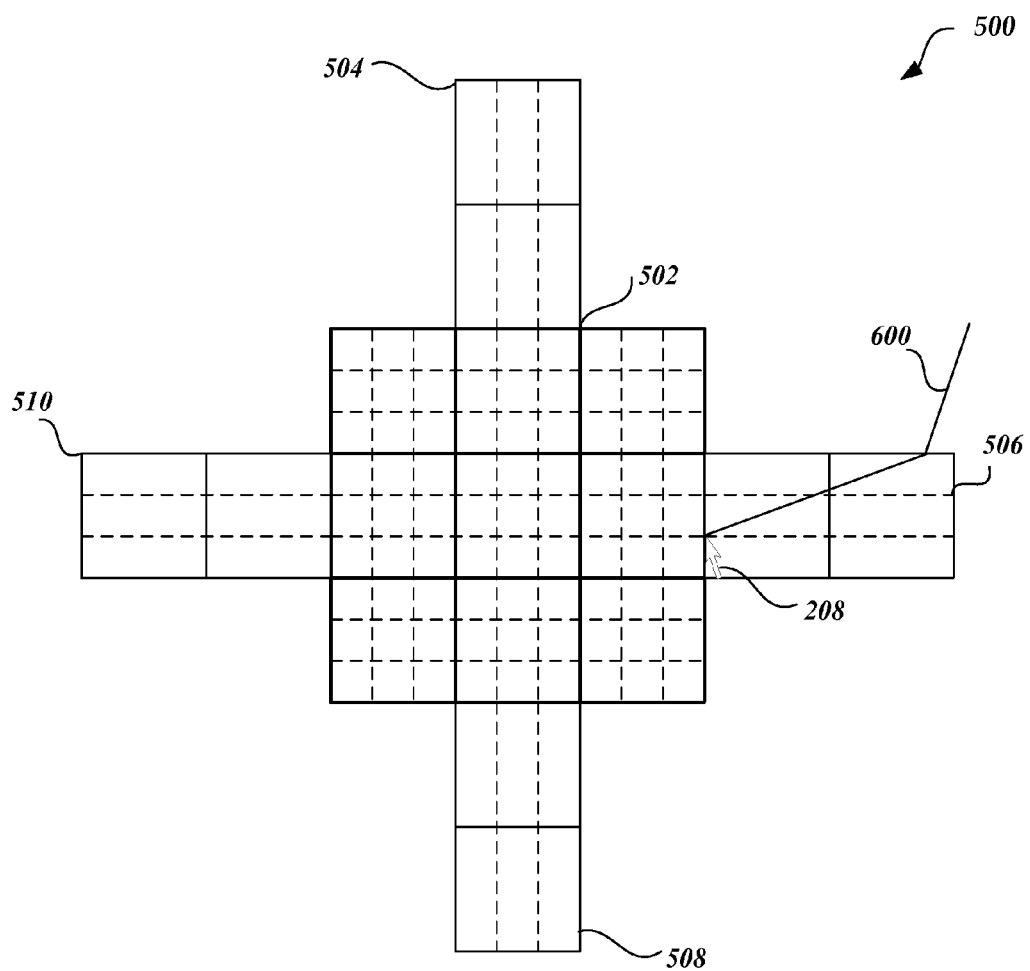
FIG. 6 is a pictorial depiction of a section of computer display with guide areas that assist users in acquiring a target in accordance with the present invention.

FIG. 6 illustrates the sample section of computer display 500 depicted in FIG. 5, where the pointer 208 intersects guide area 506. Similar to FIG. 5, a user employed input device, such as input device 110, is used to relocate the pointer 208. As illustrated in FIG. 6, when the pointer 208 intersects guide area 506, embodiments of the present invention adjust movement of the pointer toward the target 502. Vertical traversal of guide area 506 with the pointer 208 requires three times as much vertical movement from an input device as other areas of the computer display 500. Similar to FIG. 5, the path 600 is generated by input device movement of constant speed and direction. Collectively, FIGS. 5-6 illustrate that a pointer may be guided in any direction by adjusting the mapping of input device movement to pointer movement.

As illustrated in FIGS. 5 and 6, the mapping of input device movement to pointer movement is redefined in guide areas 504, 506, 508, 510 to guide the pointer toward the target 502. After the pointer is located on the target 502, pointer movement continues to be adjusted so that the pointer's location on the target may be easily maintained. The adjustment of pointer movement illustrated in FIGS. 5-6 may be altered to fulfill the needs of a graphical user interface. For example, additional or fewer guide areas may be included with a target. Obviously, when additional or fewer guide areas are included with a target, the size of the funnels (i.e., angle between guide areas) also changes. A target with a higher number of guide areas and correspondingly smaller funnels has a greater effect on pointer movement than a target with fewer guide areas and larger funnels. Thus, the relationship between target 502 and guide areas 504, 506, 508, and 510, illustrated in FIGS. 5 and 6, may be altered to include additional or fewer guide areas to match the needs of the graphical user interface.

Figure 7:
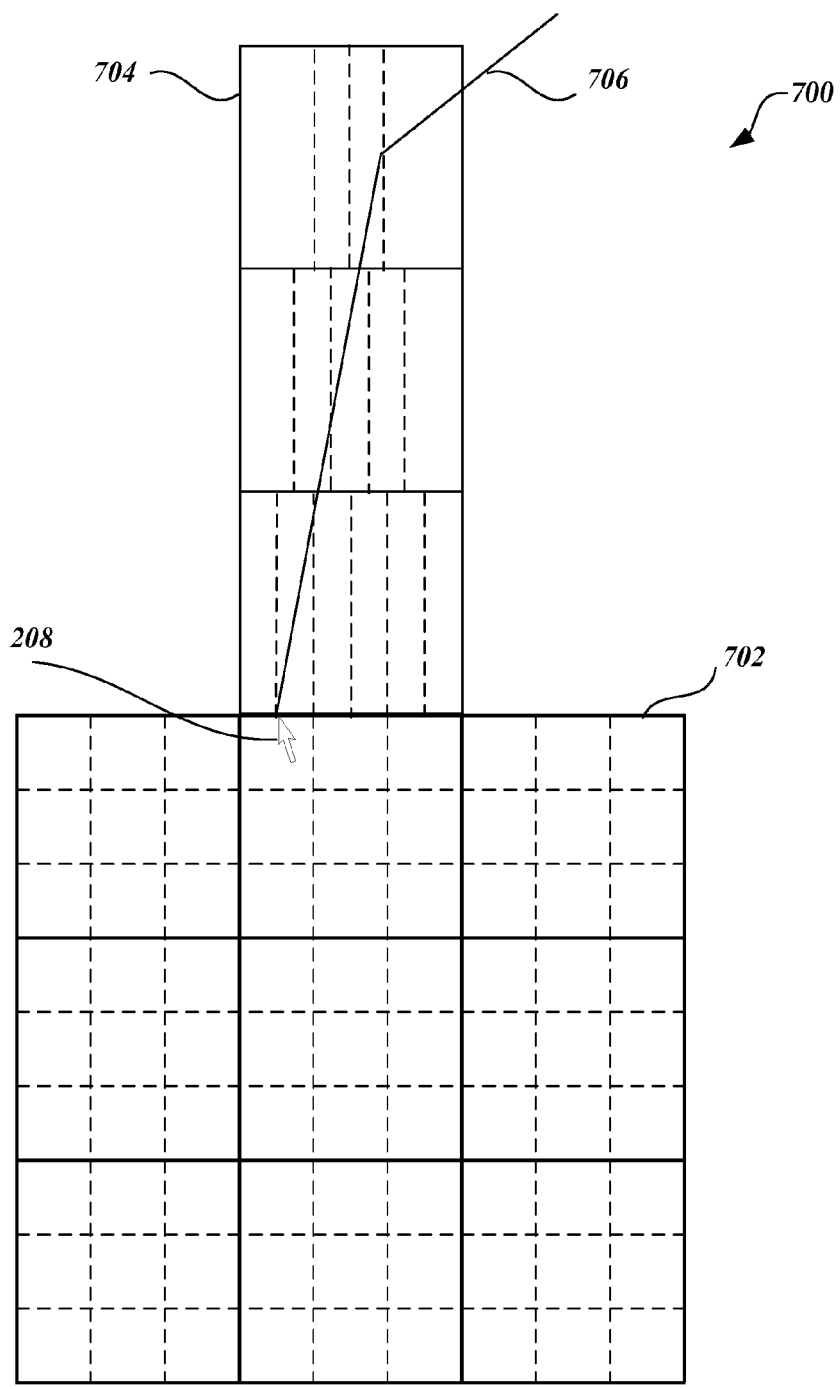
FIG. 7 is a pictorial depiction of a section of computer display with a target and guide areas that assist users in acquiring a target in accordance with the present invention.

The guide areas illustrated in FIGS. 5 and 6 are permeable barriers that help users place a pointer on a target. However, guide areas generate side effects that distort pointer movement when a user is not attempting to place a pointer on a target. FIG. 7 depicts a representative section of computer display 700 that will be used to describe an aspect of the present invention that reduces side effects caused by guide areas. Similar to FIGS. 5 and 6, the computer display 700 includes a target 702, a guide area 704, a pointer 208, and a path 706 that represent pointer 208 movement. Guide area 704 is composed of three (3) pixels in a 1×3 pixel rectangle that adjust pointer movement toward the target 702. However, adjustment of the pointer 208 depends on the distance the pointer 208 is located from the target 702. In the aspect of the invention illustrated in FIG. 7, an assumption is made that a higher likelihood exists that a user is attempting to place a pointer on target 702 when pointer movement is being generated close to the target. Thus, the area in a guide area where the mapping between input device movement and pointer movement is non-linear tapers or decreases as a guide area extends away from the target 702.

For the sake of convenience, much of the description herein is provided in the context of specific guide areas having certain qualities. It should be well understood that the examples provided herein are only illustrative and should not be construed as limiting of the invention. For example, each guide area illustrated in FIGS. 4-7 is depicted as being one pixel in width. However, guide areas may by any width and the invention is not limited to the specific applications illustrated herein.

Figure 8:
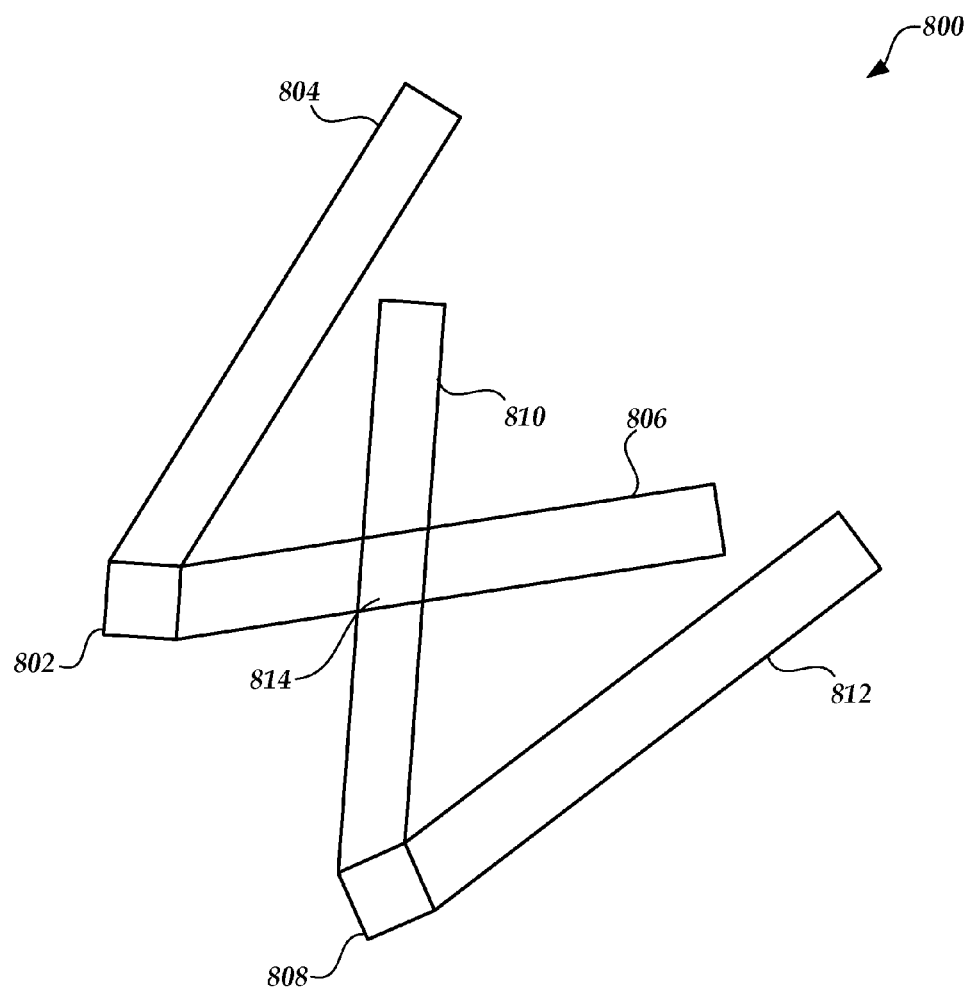
FIG. 8 is a pictorial depiction of a section of computer display with two targets and overlapping guide areas that would cause undesirable adjustment of pointer movement.

As illustrated in FIGS. 5-7, guide areas are located adjacent to a target. Typically, GUIs contain more than one target, and targets close in proximity may cause guide areas to overlap. Instead of permitting guide areas to overlap and compete for a pointer, embodiments of the present invention adjust the size and/or location of guide areas so they do not overlap. A representative section of computer display 800 is depicted in FIG. 8 that shows two targets with overlapping guide areas. The computer display 800 includes target 802 with associated guide areas 804 and 806, and target 808 with associated guide areas 810 and 812. As illustrated in FIG. 8, guide areas 806 and 810 overlap because targets 802 and 808 are close in proximity. A pointer intersecting guide areas 806 or 810 will be guided toward the overlap area 814. Adjusting pointer movement toward an area of the computer display that is not a target is undesirable. As described below with reference to FIGS. 9 and 10, the present invention adjusts the size and location of guide areas to prevent them from overlapping.

Figure 9:
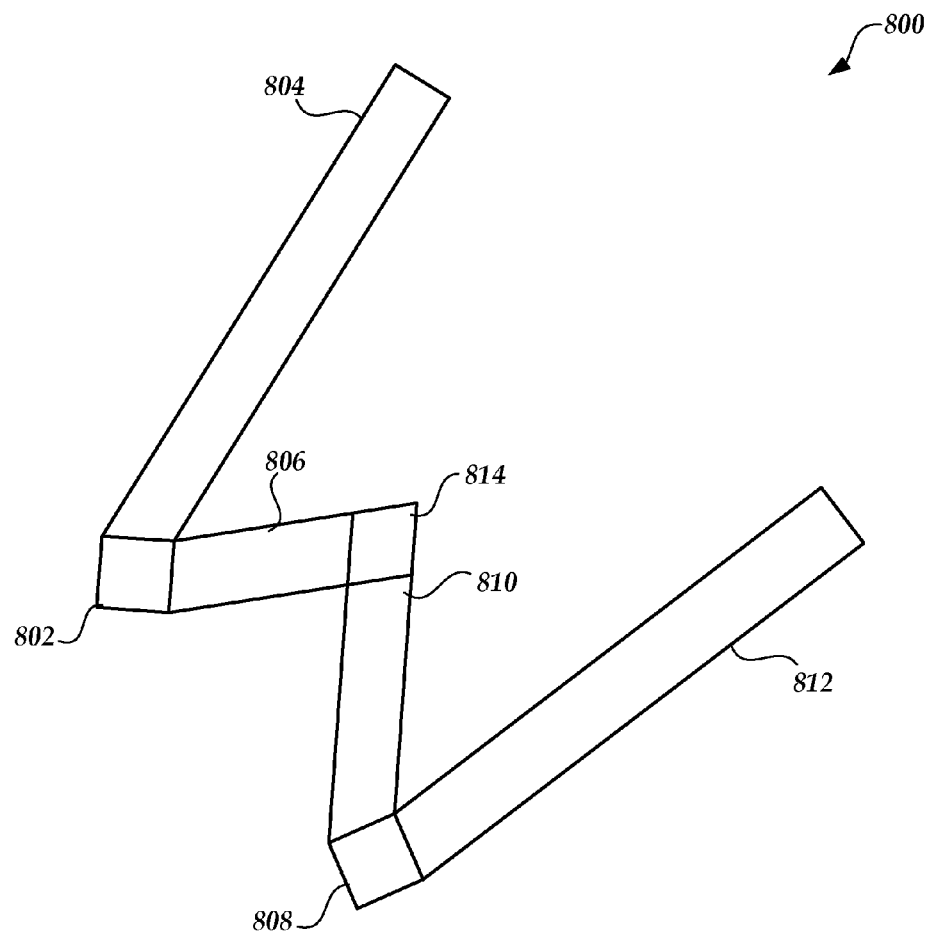
FIG. 9 is a pictorial depiction of the section of computer display illustrated in FIG. 8 wherein the size and location of overlapping guide areas are changed to prevent undesirable adjustment of pointer movement.

FIG. 9 illustrates the representative section of computer display 800 depicted in FIG. 8, wherein an embodiment of the present invention adjusts the length of guide areas 806 and 810 to prevent them from overlapping. As described further below with reference to FIGS. 11 and 12, the present invention is able to recognize when guide areas share the same area on a computer display (i.e., overlap) by comparing the coordinate positions occupied by the guide areas. As illustrated in FIG. 9, an embodiment of the present invention adjusts the length of guide areas 806 and 810 to prevent them from overlapping.

Figure 10:
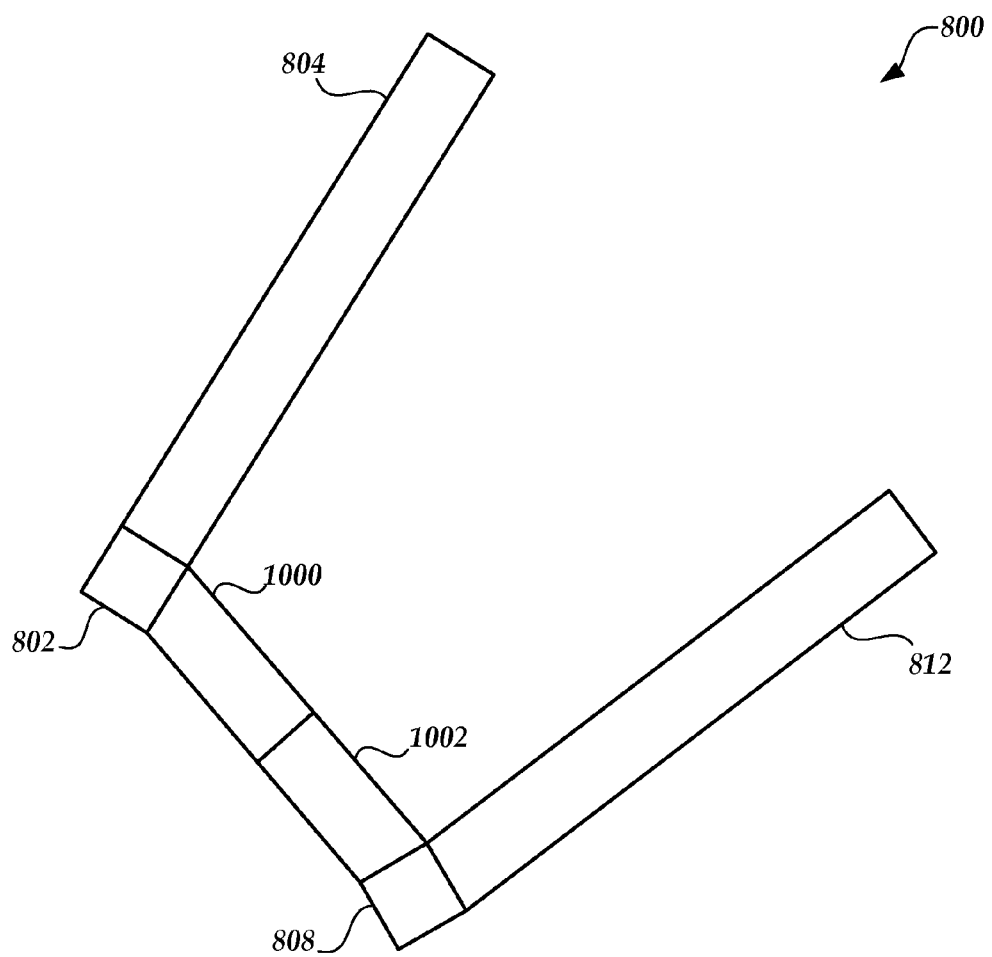
FIG. 10 is a pictorial depiction of the section of computer display illustrated in FIG. 8 wherein the size and location of overlapping guide areas are changed to prevent undesirable adjustment of pointer movement.

FIG. 10 illustrates an alternative embodiment of the present invention that adjusts the size and location of guide areas to prevent them from overlapping. Similar to FIGS. 8 and 9, the representative section of computer display 800 illustrated in FIG. 10 includes targets 802 and 808, and guide areas 804 and 812. Unlike the embodiment illustrated in FIG. 9, the embodiment illustrated in FIG. 10 replaces overlapping guide areas 806 and 810 with new guide areas 1000 and 1002. The new guide areas 1000 and 1002 extend outward from their respective targets toward the competing target.

For reasons of convenience, FIGS. 9 and 10 illustrate two targets with competing guide areas. It should be well understood that embodiments of the present invention may prevent more than two guide areas from overlapping. Thus, the depiction of two targets in FIGS. 9 and 10 is only illustrative and does not serve to limit the general application of the invention.

Figure 11:
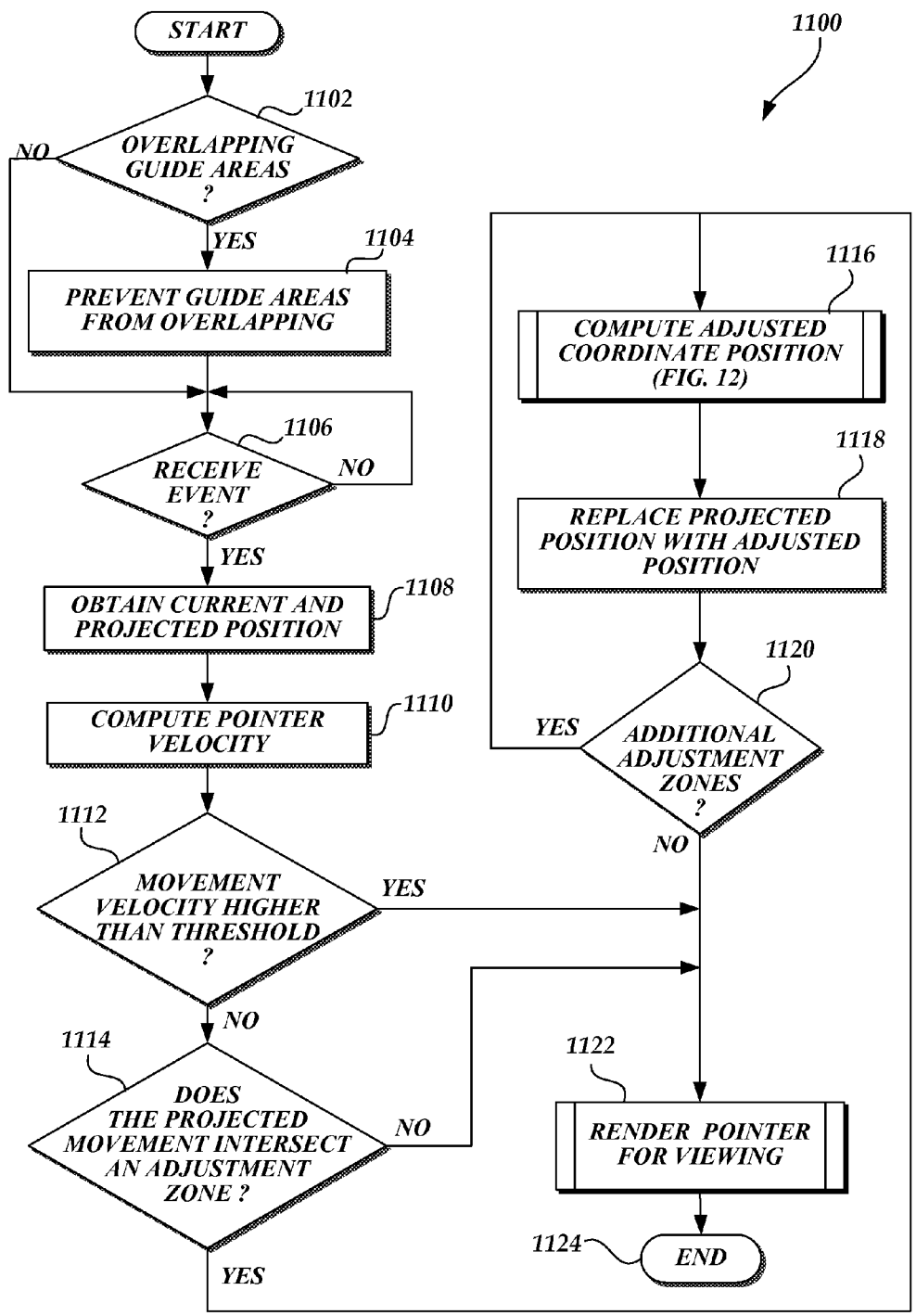
FIG. 11 is a flow diagram illustrating one exemplary embodiment of a pointer positioning method that determines how to adjust pointer movement in accordance with the present invention.

FIG. 11 is a flow diagram illustrating one exemplary embodiment of a pointer positioning method 1100 formed in accordance with the present invention. In summary, the pointer positioning method 1100 receives notice that an input device is generating pointer movement. The method 1100 determines if the projected movement of the pointer will intersect an adjustment zone, such as a target or guide area. If the projected movement does not intersect an adjustment zone, already realized (i.e., previously developed) pointer positioning software computes the new position of the pointer. Conversely, if the projected movement does intersect an adjustment zone, aspects of the present invention compute an adjusted position for the pointer. With continuing reference to FIGS. 1-10 and the accompanying descriptions, an exemplary pointer positioning method 1100 illustrated in FIG. 11 will now be described.

The pointer positioning method 1100 begins at decision block 1102 where the method 1100 determines whether two or more guide areas overlap. The present invention maintains an interface that allows computer programs, such as application 108, to define and use adjustment zones, including guide areas. Aspects of the present invention track the shape, location, and size of all adjustment zones on the computer display. The method 1100 is able to determine whether two or more guide areas overlap by comparing the coordinate positions occupied by the guide areas. If two or more guide areas do not overlap, the method 1100 proceeds to block 1104 described below.

If two or more guide areas overlap, the method 1100 proceeds to block 1104 where the size and/or location of the guide areas identified at block 1102 are adjusted. As described above with reference to FIGS. 9 and 10, aspects of the present invention either adjust the length of overlapping guide areas or replace them with new guide areas that extend outward toward a competing target.

At block 1106, the pointer positioning method 1100 waits for a pointer movement event. An input device, such as input device 110, will generate a pointer movement event and communicate the event to the operating system 104 when moved by a user. As described above, existing systems allow event-driven routines to receive notice of pointer movement events and perform actions in response to the events. In an exemplary embodiment, the event-driven routines of the present invention are implemented as callback functions which are routines passed directly to the operating system 104 as parameters in a function call. When the operating system 104 receives a pointer movement event, execution of blocks 1106-1124 is initiated by the operating system 104.

Upon receipt of a pointer movement event, the pointer positioning method 1100 proceeds to block 1108 where the method 1100 obtains the current and projected position of the pointer. As known to those skilled in the art, the coordinate position of a pointer is generally represented as a 2-tuple that includes an x-coordinate and a y-coordinate. One location on a computer display is designated as the origin with the value of the 2-tuple being (0,0). When an input device generates a pointer movement event, routines that implement the present invention receive the current and projected position of the pointer from the operating system 104. The pointer positioning method 1100 and the calculation method 1200 (described below) adjust pointer movement for every pointer movement event generated by a user. Since pointer movement events typically cause a pointer to move across multiple pixels on a computer display, calculations that determine adjustment amounts account for pointer movement across multiple pixels. Stated differently, in order to calculate an adjusted coordinate position for a pointer after a pointer movement event, a total adjustment amount for each event is calculated.

After the pointer positioning method 1100 obtains the current and projected coordinate positions of the pointer, the pointer's projected velocity is computed. At block 1110, the method 1100 obtains the time interval for the pointer movement event received at block 1106 and computes the pointer movement velocity using mathematical functions and computer-implemented routines generally known in the art.

After the pointer movement velocity is known, the pointer positioning method 1100 proceeds to decision block 1112 where the method 1100 determines whether the pointer movement velocity computed at block 1110 is higher than a predetermined threshold. In one embodiment of the present invention, pointer movement is not adjusted in an adjustment zone when the projected velocity of the pointer is higher than a predetermined threshold. In this embodiment, the method 1100 assumes that a user generating rapid pointer movement is not attempting to place a pointer on a target. If the projected pointer velocity is higher than the predetermined threshold, the method 1100 proceeds to block 1122 described below. Conversely, if projected pointer velocity is lower than or equal to the predetermined threshold, then the method 1100 proceeds to decision block 1114.

At decision block 1114, the method 1100 determines whether the pointer movement event received at block 1106 causes the pointer to intersect an adjustment zone. The present invention maintains an interface that allows computer programs, such as application 108, to define adjustment zones such as targets and guide areas. Aspects of the present invention track the shape, location, and size of all adjustment zones. The method 1100 is able to determine whether the pointer movement event received at block 1106 causes the pointer to intersect an adjustment zone by comparing the projected movement of the pointer with the coordinate positions occupied by adjustment zones. If the projected movement of the pointer does not intersect an adjustment zone, the method 1100 proceeds to block 1122 described below. Conversely, if the projected movement of the pointer does intersect an adjustment zone, the method 1100 proceeds to block 1116.

Since the projected movement of the pointer intersects an adjustment zone, an aspect of the present invention computes an adjusted coordinate position for the pointer. At block 1116, the adjusted coordinate position is calculated. One embodiment of a method for calculating an adjusted pointer position in accordance with the present invention is described below with reference to FIGS. 12-14.

At block 1118, the pointer positioning method 1100 replaces the projected coordinate position of the pointer with the adjusted coordinate position calculated at block 1116. At block 1118, the method communicates the adjusted coordinate position to the operating system 104 with software engineering techniques generally known in the art. Also at block 1118, the method passes information to the operating system 104 that indicates whether the pointer intersected a target so that computer programs that implement the present invention may provide visual, auditory, or tactile feedback to users when the pointer is placed on a target.

At decision block 1120, a test is conducted to determine whether the event received at block 1106 causes the pointer to intersect another adjustment zone. As described above at block 1114, the method 1100 determines whether an event causes the pointer to intersect an adjustment zone by comparing the projected movement of the pointer with the shape, location, and size of existing adjustment zones. If the projected movement of the pointer intersects another adjustment zone, the method 1100 proceeds back to block 1116 and blocks 1116 through 1120 are repeated until all adjustments to pointer movement are made. Thus, when a pointer event causes the pointer to intersect multiple adjustment zones, calculation of adjustment amounts occurs in the order of intersection. If the projected movement of the pointer does not intersect another adjustment zone, then the method 1100 proceeds to block 1122.

At block 1122, the pointer is rendered for viewing at the coordinate position calculated at block 1116. Since existing systems that render the pointer for viewing on a computer display are well known to those skilled in the art, the pointer rendering process is not described here. Then at block 1124, the pointer positioning method 1100 terminates.

Figure 12:
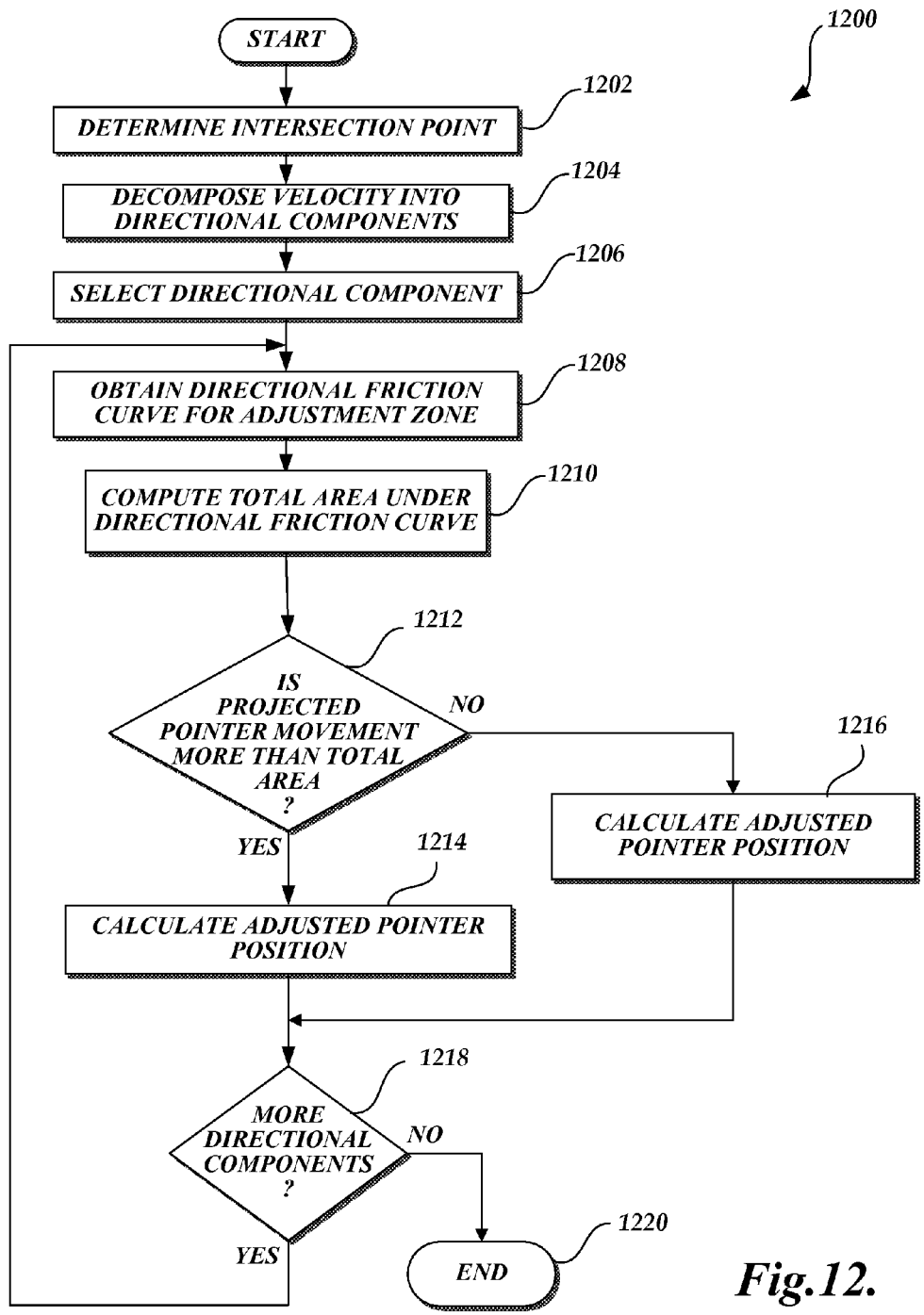
FIG. 12 is a flow diagram illustrating one exemplary embodiment of a calculation method that calculates an adjusted pointer position when the pointer intersects an adjustment zone, suitable for use in FIG. 11.

FIG. 12 is a flow diagram illustrating one exemplary embodiment of a calculation method 1200 that calculates an adjusted coordinate position when a pointer intersects an adjustment zone. With continuing reference to FIGS. 1-11 and the accompanying descriptions, the exemplary calculation method 1200 illustrated in FIG. 12 will now be described. The calculation method 1200 begins at block 1202 where the method 1200 determines the coordinate position that the pointer intersects an adjustment zone. As described above, aspects of the present invention receive the current and projected coordinate position of the pointer and track the size, shape, and location of all adjustment zones. With this information, the calculation method 1200 is able to calculate the coordinate position where the pointer intersects an adjustment zone using mathematical functions and computer implemented routines generally known in the art.

At block 1204 the projected movement of the pointer is decomposed into directional components. The movement of any entity, such as a pointer, is capable of being expressed mathematically as a vector. As known to those skilled in the art and others, a vector is a quantity that has both a magnitude and a direction. In a two-dimensional environment, pointer movement may be decomposed into a horizontal component and a vertical component which permits calculation of the change in pointer position in both the vertical and horizontal directions, respectively.

At block 1206, the calculation method 1200 selects a directional component of the pointer's movement. For each directional component selected, the calculation method 1200 adjusts the projected movement of the pointer in the selected component direction. For the sake of convenience, much of the description herein is provided in the context of a two dimensional environment where adjustment occurs in the vertical direction and the horizontal direction. However, it should be well understood that the present invention is also applicable in other environments, such as three-dimensional environments. References and examples herein to two-dimensional environments are only illustrative and should not be construed as limiting the applications of the invention.

Figure 13:
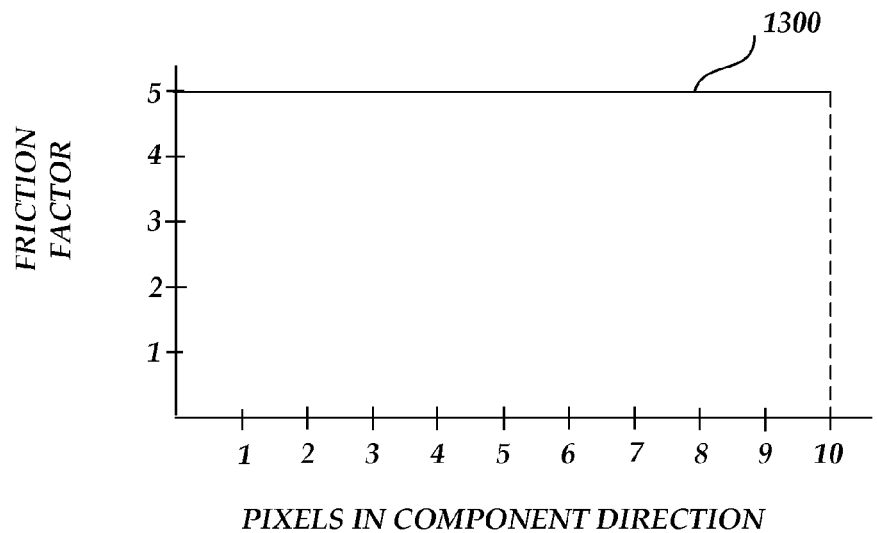
FIG. 13 is a pictorial depiction of a representative directional friction curve that illustrates calculation of resistance to pointer movement in accordance with the present invention.
Figure 14:
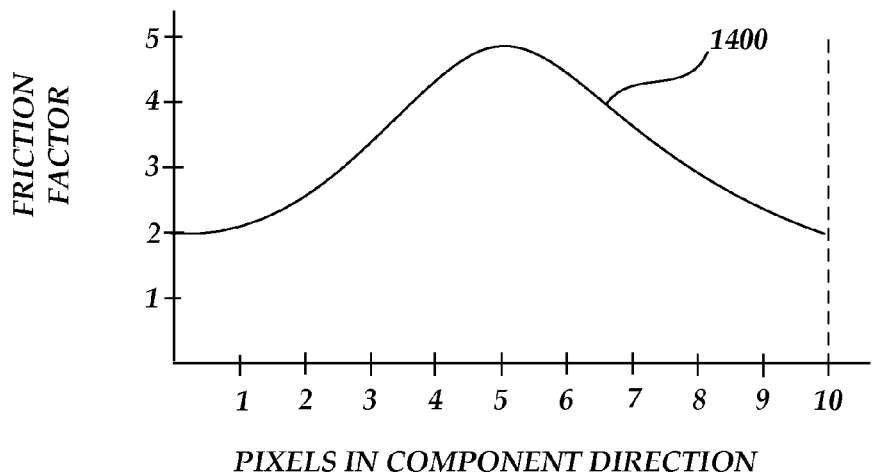
FIG. 14 is a pictorial depiction of a representative directional friction curve that illustrates calculation of resistance to pointer movement in accordance with the present invention.
Figure 15:
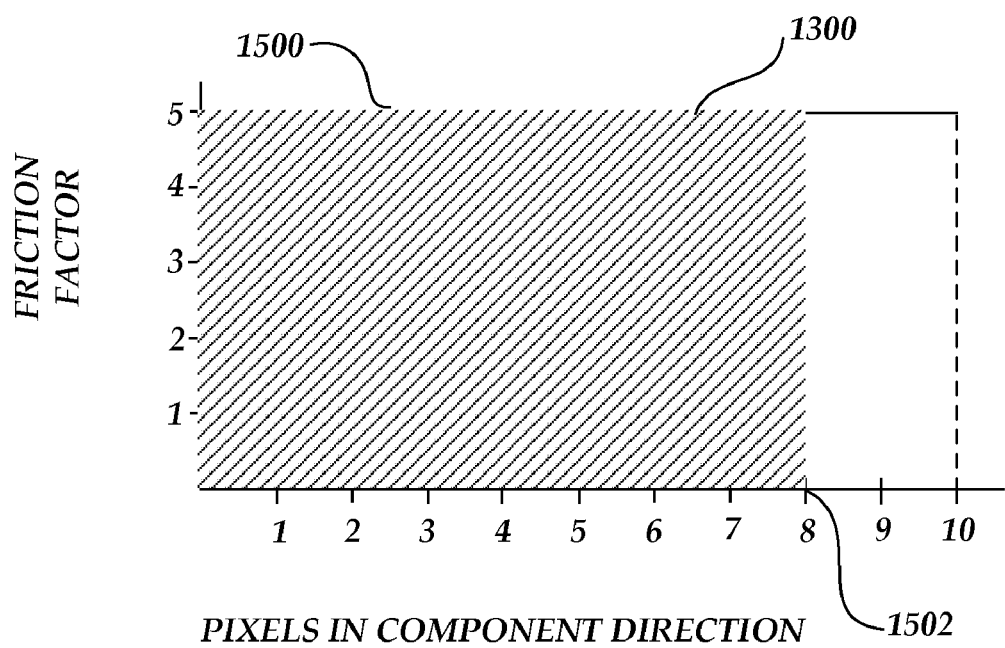
FIG. 15 is a pictorial depiction of the directional friction curve illustrated in FIG. 13 that depicts calculation of resistance to pointer movement in accordance with the present invention.

At block 1208, the calculation method 1200 obtains a directional friction curve that quantifies resistance to pointer movement in the selected component direction of the adjustment zone that the pointer will intersect. The amount that pointer movement is adjusted depends on three variables: (1) friction factor, (2) adjustment zone size, and (3) shape of the friction curve. Friction factor is a variable that quantifies the degree in which pixels in an adjustment zone resist pointer movement in one component direction. As described above with reference to FIGS. 4 and 5, the degree in which pixels resist pointer movement (i.e., friction factor) in one component direction may vary depending on the purpose of the GUI. Also, the friction factor may also vary depending on attributes of pointer movement. For example, a user generating rapid pointer movement is less likely to be attempting to place a pointer on a target. Resistance to pointer movement may be made dependent on other variables such as pointer velocity. Adjustment zone size (i.e., the number of pixels in a component direction) affects adjustment of pointer position in that larger adjustment zones cause greater total resistance to pointer movement than smaller adjustment zones with the same friction factors. Exemplary friction curves are illustrated in FIGS. 13-15 and discussed in greater detail below. In summary, a friction curve plots the size of an adjustment zone in one component direction against the friction factor assigned to the adjustment zone so that necessary adjustments to pointer movement may easily be calculated.

For illustrative purposes, representative directional friction curves are illustrated in FIGS. 13-15. In the example illustrated in FIG. 13, adjustment zone size (i.e., number of pixels in a component direction) is plotted on the x-axis and the friction factor is plotted on the y-axis. FIG. 13 illustrates a constant directional friction curve 1300, i.e., a constant resistance to pointer movement directional friction curve. As described above with reference to FIG. 11, the present invention allows computer programs, such as application 108, to define adjustment zones of different size, shape, and location. Also, as described above, adjustment zones may be defined with different values assigned to their friction factor, which allows developers to customize adjustment zones to match the needs of a GUI. In alternative applications of the present invention, the velocity of a pointer is increased in an adjustment zone. In this embodiment, the friction factor assigned to an adjustment zone is smaller than the friction factor assigned to areas of a computer display that generate linear pointer movement. Typically, a friction factor of one (1) is assigned to areas of the computer display that generate linear pointer movement. Thus, a friction factor that is greater than the value one (1) will create resistance to pointer movement and a value less than one (1) will cause the velocity of the pointer to increase. Aspects of the present invention track the attributes of adjustment zones and generate directional friction curves, such as directional friction curve 1300.

FIG. 14 illustrates a directional friction curve 1200 that is not linear in that resistance to pointer movement in an adjustment zone varies depending on the pointer's location in the adjustment zone. Similar to FIG. 13, the size of the adjustment zone (i.e., number of pixels in a component direction) is plotted on the x-axis and the friction factor assigned to the adjustment zone is plotted on the y-axis. In one embodiment of the present invention, computer programs may define adjustment zones with friction factors that are not constant. Again, aspects of the present invention track the attributes assigned to adjustment zones and generate appropriate directional friction curves.

Returning to FIG. 12, the calculation method 1200, at block 1210, computes the total area under the directional friction curve obtained at block 1208. As will be described in more detail below, the area under a directional friction curve is a measure of total resistance to pointer movement over one component direction of an adjustment zone. In some instances, pointer movement will be adjusted by the total area under a directional friction curve. In other instances, a portion of the area under a directional friction curve is used to calculate an adjustment amount.

At decision block 1212, a test is conducted to determine whether the area under the directional friction curve, calculated at block 1210, is larger than the projected movement of the pointer in the selected component direction after the pointer intersects the adjustment zone. If the area under the directional friction curve is larger than the pointer's projected movement after intersecting the adjustment zone, the pointer will remain inside the adjustment zone. In this instance, a portion of the area under the directional friction curve is used to calculate an adjustment amount. Conversely, if the area under the directional friction curve is not larger than the pointer's projected movement, the pointer will move outside the adjustment zone. In this instance, the total area under the directional friction curve, which represents total resistance to pointer movement in one component direction of an adjustment zone is the adjustment amount. If the area under the directional friction curve is larger than the pointer's projected movement, the calculation method 1200 proceeds to block 1216 described below. Conversely, if the area under the directional friction curve is not larger than the selected directional component of the pointer's velocity, the method 1200 proceeds to block 1214.

At block 1214, the calculation method 1200 reduces pointer movement in the selected component direction by the total area under the directional friction curve. For example, if the projected movement of the pointer after intersecting an adjustment zone that is ten (10) pixels in length is fifty (50) pixels and the area under the directional friction curve is thirty (30) units, the final pointer movement in the component direction is twenty (20) pixels (50 pixels–30 pixels=20 pixels) plus the length of the adjustment zone. Since the adjustment zone is ten (10) pixels in length, the total pointer movement is thirty (30) pixels (20 pixels+10 pixels=30 pixels). Then the method 1200 proceeds to block 1218 described in detail below.

If the calculation method 1200 reaches block 1216, the area under the directional friction curve is more than the projected pointer movement after intersecting the adjustment zone. In this situation, a portion of the area under the directional friction curve is used to calculate an adjustment amount. As described above with reference to FIGS. 13 and 14, the size (i.e., number of pixels in a component direction) of an adjustment zone is plotted on the x-axis of a directional friction curve. At block 1216, the calculation method 1200 determines the point on the x-axis where the area under the directional friction curve is equal to the projected movement of the pointer after intersecting the adjustment zone. The area under the directional friction curve before this point is used to calculate an adjustment amount.

Calculation of the adjustment amount at block 1216 is best described with an example. FIG. 15 is an illustration of the directional friction curve 1300 depicted in FIG. 13. As described above, the directional friction curve 1300 plots the size of an adjustment zone (i.e., number of pixels in a component direction) on the x-axis and the friction factor on the y-axis. Together these variables form a directional friction curve 1300 where constant resistance to pointer movement in one component direction is generated. As illustrated in FIG. 15, the total area 1500 under the direction friction curve 1300 is equal to 50 units (5 friction factor×10 pixels=50 units). If the projected movement of the pointer after intersecting the adjustment zone is forty (40) pixels, then the adjustment amount is equal to thirty-two (32) pixels. As described above, the calculation method 1200 determines the point 1502 on the x-axis of the directional friction curve 1300 where the area under the curve is equal to the projected movement of the pointer. In the example illustrated in FIG. 15, the point 1502 on the x-axis where the area under the directional friction curve equals the projected movement in the selected component direction is at 8 pixels. The point 1502 on the x-axis where the area under the directional friction curve equals the projected movement is subtracted from the projected movement to obtain the adjustment amount. In the example illustrated in FIG. 15, the adjustment amount is equal to thirty-two (32) pixels (40 pixels−8 pixels=32 pixels) and the final pointer movement in the selected component direction is eight (8) pixels (40 pixels−32 pixels=8 pixels).

Returning to FIG. 12, at decision block 1218, a test is conducted to determine whether all directional components of the pointer's movement have been adjusted. If a directional component of the pointer's movement has not been adjusted, the calculation method 1200 proceeds back to block 1208 and blocks 1208 through 1218 are repeated until adjustments are made in the necessary component directions. Conversely, if all necessary adjustments have been made then the method 1200 proceeds to block 1220 where it terminates.

Figure 16:
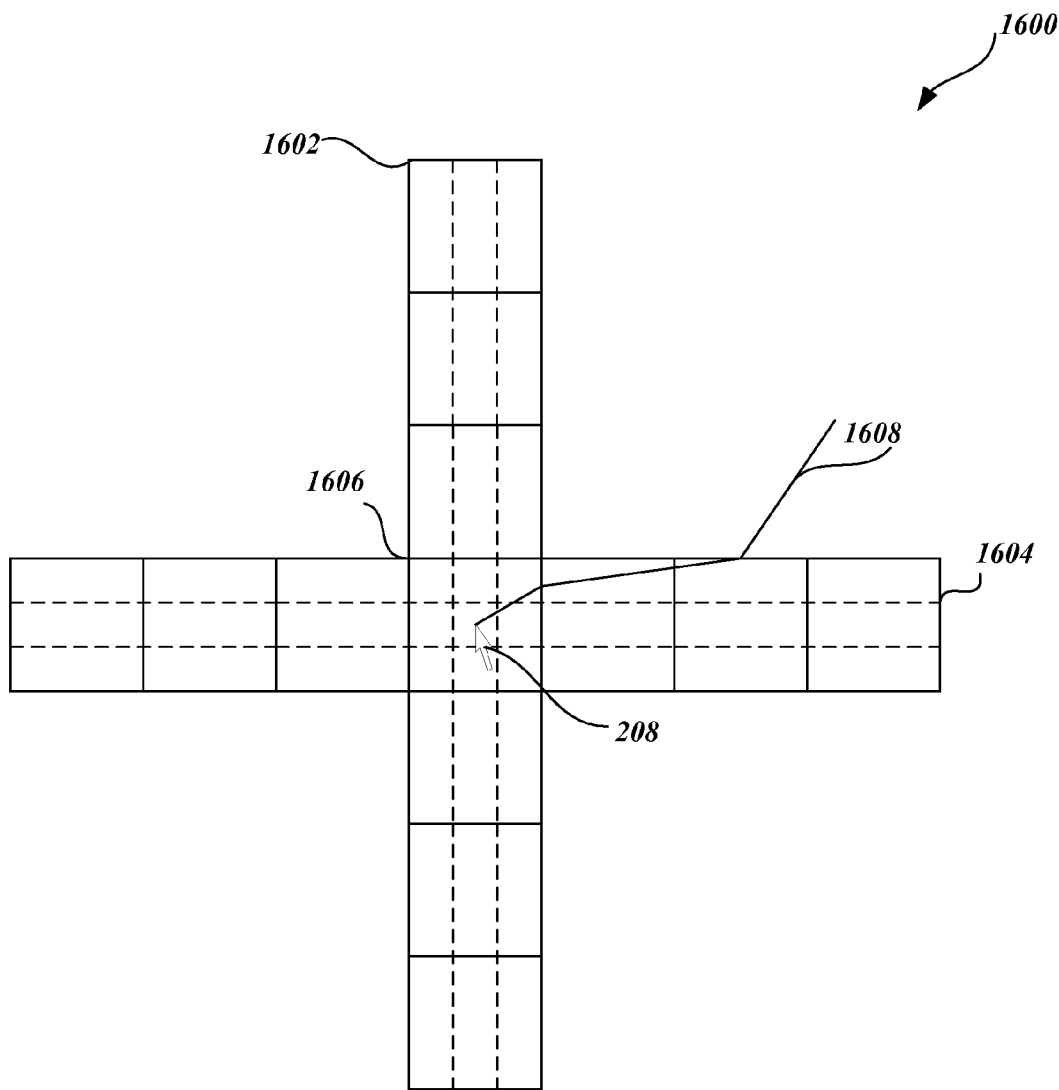
FIG. 16 is a pictorial depiction of a section of computer display with guide areas that assist users in acquiring a target in accordance with the present invention.

It should be understood that embodiments of the present invention may be combined in different ways than described above. For example, FIGS. 5-7 and the accompanying descriptions depict guide areas in combination with a target. In accordance with these embodiments, pointer movement is adjusted in guide areas to help users place a pointer on a target. After the pointer is located on the target, pointer movement is adjusted by the same proportional amounts in all component directions so that the position of the pointer may be maintained. In other embodiments of the present invention, similar functionality is achieved by overlaying guide areas. For example, FIG. 16 illustrates a representative section of computer display 1600 with two overlaying guide areas 1602 and 1604 that create an overlap area 1606 that will typically be located on a target (i.e., a location on the computer display where a pointer selection event may occur). Guide area 1602 is composed of five (5) pixels in a 1×5 pixel rectangle and guide area 1604 is composed of five (5) pixels in a 5×1 pixel rectangle. Similar to the embodiments illustrated in FIGS. 5-7, the path 1608 of the pointer's movement is adjusted toward the overlap area 1606 when guide area 1604 is intersected. However, when the pointer 208 intersects the overlap area 1606, guide area 1602 also effects pointer 208 movement. The combined effect of guide areas 1602 and 1604 in overlap area 1606 is to adjust pointer movement toward the center of the overlap area 1602.

While presently preferred embodiments of the invention have been illustrated and described, it is to be understood that within the scope of the appended claims the invention can be practiced in other ways than those specifically described herein.

The embodiments of the invention in which an exclusive property or privilege is claimed are defined as follows:

1. In a computer device that includes a display for displaying a graphical user interface that includes a pointer, a pointer input device, and an operating system, a method of guiding a pointer toward a target comprising:
   in response to receiving notice of a pointer movement event, obtaining the current and projected coordinate positions of the pointer;
   determining that the pointer intersects a guide area during movement,
   the guide area comprising an area on the display configured to guide the pointer toward the target;
   in response to determining that the pointer intersects the guide area, calculating an adjusted coordinate position based at least in part on the pointer intersecting the guide area for the pointer by redirecting wherein pointer movement toward the target while inside the bounds of the guide area, such that the pointer movement inside the guide area is non linear in one component direction in relation to movement of the input device; and replacing the projected coordinate position of the pointer with the adjusted coordinate position.

2. The method as recited in claim 1, further comprising providing feedback to the user that the pointer intersected the target.

3. The method as recited in claim 2, the feedback comprising visual, auditory, or tactile information.

4. The method as recited in claim 1, wherein the amount that pointer movement is redirected toward the target while inside the guide area increases as the proximity of the pointer is closer to the target.

5. The method as recited in claim 1, further comprising determining that the guide area associated with the target is scheduled to overlap with the guide area that is associated with a different target and responsive to the determining that the guide areas are scheduled to overlap, preventing the guide areas from overlapping.

6. The method as recited in claim 5, wherein preventing the guide areas from overlapping includes shortening the length of guide areas associated with the target and the different target that are scheduled to overlap.

7. The method as recited in claim 5, wherein preventing the guide areas from overlapping includes changing an angle at which the guide area extends outward from the target toward the different target.

8. The method as recited in claim 1, further comprising adjusting a quantity of guide areas surrounding the target.

9. The method as recited in claim 1, further comprising adjusting a strength of guide areas surrounding the target.

10. One or more tangible computer readable media device encoded with computer-executable instructions that, when executed, configured a computer system to perform a method for adjusting pointer movement to facilitate acquiring a target displayed on a computer display including:
    receiving from an operating system component event data when pointer movement events occur;
    determining via a pointer positioning component that whether the projected path of the pointer will intersect a guide area; the guide area comprising an area on the display configured to guide the pointer towards the target;
    adjusting via the pointer positioning component the pointer movement in one component direction toward the target while inside the bounds of the guide area by calculating via a calculation component an amount that pointer movement inside the guide area is non-linear in one component direction in relation to movement of an input device; providing the operating system component with an adjusted coordinate position of the pointer based on the adjusting and causing the computer display to present the pointer at the adjusted coordinate position based at least in part on the determining that projected path of the pointer will intersect the guide area.

11. The tangible computer-readable medium device as recited in claim 10, the method further comprising providing via the pointer positioning component wherein feedback to the user that the pointer intersected the target.

12. The computer-readable medium as recited in claim 11, the feedback comprising visual, auditory, or tactile information.

13. The tangible computer-readable medium device as recited in claim 10, the method further comprising increasing an amount that pointer movement is redirected towards the target as the pointer moves toward the target.

14. The tangible computer-readable medium device as recited in claim 10, the method further comprising allowing application wherein the pointer component is further configured to allow applications programs to create GUI objects comprised of a guide area and a target.

15. The tangible computer-readable medium device as recited in claim 10, the method further comprising preventing wherein the pointer position component is competing guide areas associated with different targets from overlapping.

16. The computer-readable medium as recited in claim 15, wherein preventing competing guide areas associated with different targets from overlapping includes shortening a length of guide areas associated with the target and the different target that are scheduled to overlap.

17. The computer-readable medium as recited in claim 15, wherein preventing competing guide areas associated with different targets from overlapping includes changing an angle at which that the guide area extends outward from the target toward the different target.

18. A system, comprising:
    one or more processors; and
    memory, communicatively coupled to the one or more processors, storing a movement adjustment module configured to:
    receive event data when pointer movement events occur;
    determine an adjusted coordinate position of the pointer by:
       determining that a projected path of the pointer will intersect a guide area;
       determining that the guide area associated with a target is scheduled to overlap with the guide area that is associated with a different target and responsive to the determining that the guide areas are scheduled to overlap, preventing the guide areas from overlapping by changing an angle at which the guide area extends outward from the target toward the different target;
       calculating an amount that pointer movement inside the guide area is non-linear in one component direction in relation to movement of an input device; and
       adjusting the pointer movement in one component direction toward the target while inside the bounds of the guide area, the adjusting based at least in part on the calculating; and
    cause the computer display to present the pointer at an adjusted coordinate position.

* * * * *